Sept. 15, 1959 H. K. GLEASMAN 2,903,913
SEMI-AUTOMATIC TWO-SPEED GEAR DRIVE FOR VELOCIPEDES OR THE LIKE
Filed Oct. 16, 1957
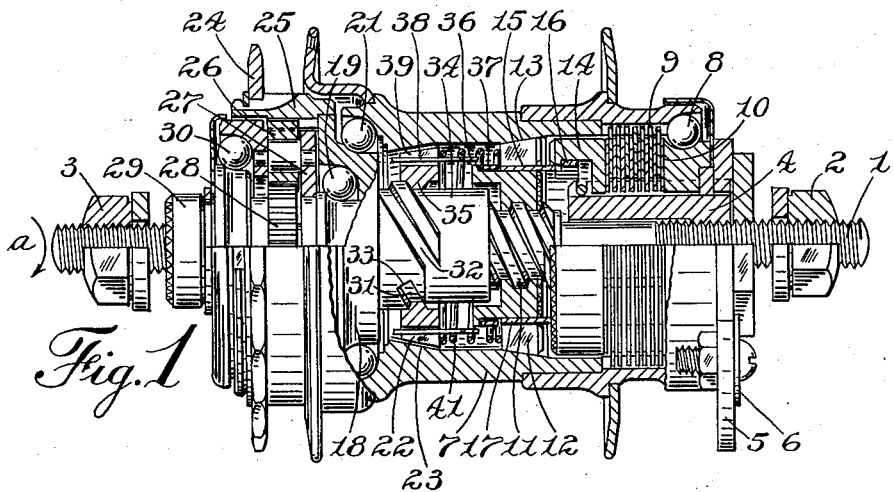
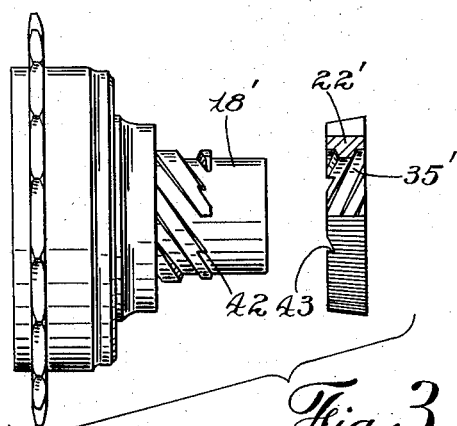
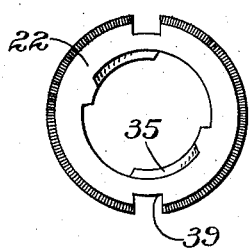
INVENTOR.
Hollis K. Gleasman

United States Patent Office 2,903,913
Patented Sept. 15, 1959

2,903,913

SEMI-AUTOMATIC TWO-SPEED GEAR DRIVE FOR VELOCIPEDES OR THE LIKE

Hollis K. Gleasman, Elmira, N.Y., assignor to Bendix Aviation Corporation, Elmira Heights, N.Y., a corporation of Delaware Application October 16, 1957, Serial No. 690,470

3 Claims. (Cl. 74—750)

The present invention relates to a semi-automatic two speed gear drive for velocipedes or the like and more particularly to a hub brake and transmission in which the change in gear ratio is brought about by a back pedaling operation.

The present invention relates to the same type of device as the structure shown in the application of Hood Ser. No. 566,449, filed February 20, 1956, now Patent No. 2,865,478, issued December 23, 1958, and assigned to the assignee of the present application.

It is an object of the present invention to provide a novel semi-automatic two speed gear drive which is simple in construction reliable in operation and economical to manufacture.

It is another object to provide such a device in which the gear changing means is positive in action and free from the necessity of fine adjustment or close tolerances. the parts are of rugged construction capable of maintaining their operative condition in spite of careless or rough actuation by the operator.

Further objects and advantages will be apparent from the following description taken in connection with the accompany drawing in which:

Fig. 1 is a side elevation, partly broken away and in section of a preferred embodiment of the invention;

Fig. 2 is a detail of the high speed clutch nut illustrated in Fig. 1; and

Fig. 3 is a detail of a modified form of high speed screw shaft and clutch nut.

In Fig. 1 of the drawing there is illustrated a stationary axle adapted to be clamped in the rear fork of a bicycle or the like by means of clamp nuts 2 and 3. A brake anchor member 4 is mounted on the axle 1 and prevented from rotation by a torque arm 5 which is attached to a frame member of the vehicle by a clip 6 in the conventional manner for devices of this type. A hub 7 is rotatably supported at one end on the anchor member 4 by means of bearings 8, and is arranged to be frictionally connected to the anchor member by means of a plurality of discs 9, 10 splined alternately to the hub and anchor member.

A low speed screw shaft 11 is rotatably mounted on the axle 1 and has a low speed clutch nut 12 threaded thereon for traversal by forward rotation of the screw shaft 11 into clutching engagement with a conical clutch surface 13 in the interior of the hub. Backward rotation of the low speed screw shaft 11 is arranged to traverse the clutch nut 12 into engagement with a pressure ring 14 splined on the anchor member 4 to apply the brake by compressing the brake discs 9, 10. Traversal of the clutch nut 12 is insured by means of a retarder drag ring 15 having a spring arm 16 bearing frictionally in the pressure ring 14 and having a tongue 17 traversing a groove in the clutch nut 12 to form a splined connection therewith.

A high speed screw shaft and driving member 18 is rotatably mounted on the low speed screw shaft by means of bearings 19 and supports the hub 7 by means of bearings 21. A high speed clutch nut 22 is threaded on the high speed screw shaft 18 for traversal by forward rotation of said screw shaft into driving engagement with a high speed conical clutch surface 23 formed in the interior of said hub.

A sprocket 24 is fixedly mounted on an orbit gear 25 which is rigidly mounted on the end of the high speed screw shaft 18. Planetary pinions 26 are mounted on a planet carrier 27 which is fixed on the end of the low speed screw shaft 11 and supported by a bearing 30. The planets 26 mesh with a sun gear 28 which is formed on an anchoring thimble 29 arranged to be clamped to the vehicle frame by the clamp nut 3 and forming the support for bearing 30.

As best shown in Fig. 1, the high speed screw shaft 18 has a multi-lead thread formed by two sets of thread grooves, one set 31 being shorter than the other set 32 and terminating in abutments 33 arranged to prevent the clutch nut 22 from traversing into engagement with the clutch surface 23 in the hub 7. The high speed screw shaft 18 is also formed with a smooth portion 34 beyond the threaded portion which permits the clutch nut 22 to run off the ends of the thread of said screw shaft upon backward rotation of the screw shaft.

The high speed clutch nut 22 is provided with internal threads corresponding to one set only of the thread grooves of the high speed screw shaft. As illustrated, the high speed screw shaft has four equally spaced thread grooves, two long grooves 32 spaced 180° apart and two interposed short grooves 31, while the clutch nut 22 is formed with two threads located 180° apart. From this it will be seen that when said clutch nut is so oriented on the high speed screw shaft that its threads 35 enter the long thread grooves 32 of said screw shaft, forward rotation of the screw shaft will traverse the clutch nut into driving engagement with the clutch surface 23 of the hub, but when the threads of the clutch nut 22 enter the short thread grooves 31 of the screw shaft, they are arrested by the abutments 33 so as to hold the clutch nut out of engagement with the hub.

Traversal of the clutch nut 22 is assured by means of a drag ring 36 having a spring arm 37 bearing frictionally on the low speed clutch nut 12, and a tongue 38 engaging in an axial groove 39 in the clutch nut 22. A reentry spring 41 located between the clutch nuts 12 and 22 insures engagement of the high speed clutch nut 22 with one or the other of the sets of thread grooves in the high speed screw shaft upon forward rotation thereof.

In Fig. 1 of the drawing the transmission is illustrated in the low gear driving position with the low speed clutch nut 12 in driving engagement with the clutch surface 13 of the hub. In this position of the parts, forward rotation of the sprocket 24 in the direction of the arrow (a) will be transmitted through the planetary gearing 25, 26, 28 to the low speed screw shaft 11 and through the clutch nut 12 to the hub 7 to propel the vehicle in low gear. At this time, the threads 35 of the high speed clutch nut 22 are located in the short thread grooves 31 of said screw shaft, and the abutments 33 prevent the clutch nut 22 from engaging the hub.

When it is desired to operate in high gear, the operator back pedals sufficiently to cause the high speed clutch nut 22 to run off the threaded portion of its screw shaft on to its smooth portion 34 thereof, and to cause said screw shaft to rotate backward 90° or more to bring the longer thread grooves 32 into registry with the threads 35 of the clutch nut. It will be understood that the parts are so proportioned that this action is brought about before the backward traversal of the low speed clutch nut 12 by the slower backward rotation of the low speed screw shaft has brought it into engagement with the brake actuating member 14.

Upon forward rotation of the sprocket 24, the high speed clutch nut 22 reengages the threaded portion of the high speed screw shaft 18, such reengagement being insured by the reentry spring 41; the threads 35 of the clutch nut now entering the longer grooves 32 whereby the clutch nut 22 is caused to engage the clutch surface 23 and drive the hub at the same speed as the sprocket 24.

During high speed operation, the low speed clutch nut 12 will move into contact with the surface 13 of the hub, but since the hub is rotating faster than said clutch nut there is only sufficient engagement at this point to cause rotation of the drag ring 15.

In Fig. 3 of the drawing there is illustrated a modification of the high speed screw shaft at 18' and the high speed clutch nut at 22' in which the screw shaft is uniformly threaded, but each lead is notched on its end to form a shoulder at 42, and the clutch nut 22' is provided with an equal number of internal threads 35' and is formed with recesses 43 adapted to receive said shoulders 42 when aligned therewith and thereby prevent entry of the clutch nut on the threaded portion of the screw shaft.

The operation of this embodiment of the invention is the same as above set forth except that in this case, with both the screw shaft and clutch nut having four lead threads, the indexing to go from one gear ratio to the other is through approximately one half the angle required in the first embodiment.

Although certain structure has been shown and described in detail it will be understood that changes may be made in the precise form and arrangement of the parts without departing from the spirit of the invention as defined in the accompanying claims.

I claim:

1. In a two-speed rear hub and brake for velocipedes or the like a stationary axle, a hollow hub rotatably mounted thereon having in its interior a low-speed clutch surface and a high-speed clutch surface, low-speed and high-speed screw shafts rotatably mounted in the hub, clutch nuts threaded on said screw shafts for traversal into driving engagement with the corresponding clutch surfaces in the hub, means for rotating said screw shafts, said high-speed screw shaft having a smooth portion forming a journal for its clutch nut beyond the end of its threads, and being formed with a multi-lead thread, certain of said threads having abutments adapted to engage the high-speed clutch nut and prevent it from moving into engagement with the hub; and means for indexing said high-speed clutch nut on its screw shaft into and out of position to engage said abutments including a frictional drag connection from the high-speed clutch nut to the stationary axle causing said nut to run off the ends of the threads on its screw shaft on backward rotation of said screw shaft and a spring bearing on the low-speed clutch nut urging the high-speed clutch nut into engagement with the threads of its screw shaft.

2. A device as set forth in claim 1 in which the high speed screw shaft is formed with a multi-lead thread having two sets of equally spaced thread grooves, one set being shorter than the other, and the high speed clutch nut is provided with thread leads corresponding to one only of said sets; said short thread grooves terminating in abutments positioned to arrest the traversal of said clutch nut and prevent it from engaging the hub when the thread leads of the clutch nut are engaged therein.

3. A device as set forth in claim 1 in which the high-speed screw shaft is formed with a multi-lead thread, the ends of said leads being notched to form shoulders, and the adjacent face of said clutch nut having recesses adapted to receive said shoulders when alined therewith.

References Cited in the file of this patent

UNITED STATES PATENTS 2,765,678    Hood _____ Oct. 9, 1956